US010729290B2

(12) United States Patent
Williams et al.

(10) Patent No.: US 10,729,290 B2
(45) Date of Patent: Aug. 4, 2020

(54) TOILET AND OPERATION THEREOF

(71) Applicant: CRANFIELD UNIVERSITY, Bedfordshire (GB)

(72) Inventors: Leon Brett Matthew Williams, Bedfordshire (GB); Jake Aaron Larsson, Bedfordshire (GB); Ross Cochrane Tierney, Bedfordshire (GB); Matthew Spencer Collins, Bedfordshire (GB)

(73) Assignee: Cranfield University, Cranfield Bedfordshire (GB)

( * ) Notice: Subject to any disclaimer, the term of this patent is extended or adjusted under 35 U.S.C. 154(b) by 6 days.

(21) Appl. No.: 16/081,133

(22) PCT Filed: Mar. 1, 2017

(86) PCT No.: PCT/EP2017/054820
§ 371 (c)(1),
(2) Date: Aug. 30, 2018

(87) PCT Pub. No.: WO2017/149036
PCT Pub. Date: Sep. 8, 2017

(65) Prior Publication Data
US 2019/0014958 A1 Jan. 17, 2019

(30) Foreign Application Priority Data
Mar. 1, 2016 (GB) .................................. 1603551.1

(51) Int. Cl.
*A47K 11/02* (2006.01)
*E03D 11/12* (2006.01)
*E03D 11/10* (2006.01)

(52) U.S. Cl.
CPC .............. *A47K 11/02* (2013.01); *E03D 11/10* (2013.01); *E03D 11/12* (2013.01); *Y02A 50/453* (2018.01); *Y02A 50/454* (2018.01)

(58) Field of Classification Search
CPC .................. A47K 11/02; A47K 11/023; A47K 11/03–035; A47K 11/10;
(Continued)

(56) References Cited

U.S. PATENT DOCUMENTS 548,395 A * 10/1895 Rogers ................... A47K 11/02
4/473
2,768,386 A * 10/1956 Graef ................... A47K 11/023
4/111.2
(Continued)

FOREIGN PATENT DOCUMENTS

| CN | 102641092 A | 8/2012 |
| CN | 204134483 U | 2/2015 |

(Continued)

OTHER PUBLICATIONS

International Preliminary Report on Patentability from PCT/EP2017/054816 dated Sep. 4, 2018 (7 pages).
(Continued)

*Primary Examiner* — David P Angwin
*Assistant Examiner* — Nicholas A Ros
(74) *Attorney, Agent, or Firm* — Calfee, Halter & Griswold LLP

(57) ABSTRACT

A toilet is disclosed, having a bowl (400) for receiving human waste and a wiper (402). The bowl (400) is moveable between a waste receiving position and a waste emptied position. This movement is provided based on a waste emptying actuation by a user of the toilet. The wiper (402) is movable to remove residual waste from an inside surface of the bowl (400) by wiping the inside surface of the bowl
(Continued)

(400). The movement of the wiper (402) is coupled to the movement of the bowl (400), the wiper (402) being configured to move during the movement of the bowl (400), for at least a part of the movement of the bowl (400) between the waste receiving position and the waste emptied position.

20 Claims, 10 Drawing Sheets

(58) Field of Classification Search
CPC .. E03D 11/02–08; E03D 11/10; E03D 11/111; E03D 11/12; E03D 9/10
USPC .......................................... 4/316, 467, 473
See application file for complete search history.

(56) References Cited

U.S. PATENT DOCUMENTS

| | | | |
|---|---|---|---|
| 3,361,645 A | | 1/1968 | Bodell |
| 3,624,843 A * | | 12/1971 | Andrus ................ A47K 11/02 |
| | | | 4/111.3 |
| 3,727,241 A * | | 4/1973 | Drouhard, Jr. ............ E03D 9/10 |
| | | | 4/319 |
| 3,837,012 A * | | 9/1974 | Rassbach ............... A47K 11/02 |
| | | | 4/111.3 |
| 4,316,774 A | | 2/1982 | Trusch |
| 6,467,101 B1 * | | 10/2002 | Artola ...................... E03D 3/10 |
| | | | 4/213 |
| 6,526,598 B1 | | 3/2003 | Black |
| 8,555,428 B2 * | | 10/2013 | Blake ..................... E03D 5/012 |
| | | | 4/434 |
| 8,719,973 B2 * | | 5/2014 | Miner .................... A47K 11/02 |
| | | | 4/476 |
| 2010/0058525 A1 | | 3/2010 | Aitchison |
| 2014/0318272 A1 | | 10/2014 | Pietron et al. |
| 2014/0318373 A1 | | 10/2014 | Wood et al. |
| 2015/0217232 A1 | | 8/2015 | MacCallum et al. |

FOREIGN PATENT DOCUMENTS

| | | |
|---|---|---|
| CN | 205116353 U | 3/2016 |
| DE | 2630089 A1 | 1/1978 |
| DE | 29617815 | 11/1996 |
| DE | 10012040 A1 | 8/2000 |
| EP | 1384831 A1 | 1/2004 |
| EP | 2732745 | 5/2014 |
| EP | 2732745 A1 | 5/2014 |
| FR | 2976172 A1 | 12/2012 |
| FR | 2976172 A1 | 12/2012 |
| GB | 358544 A | 10/1931 |
| GB | 1375750 | 11/1974 |
| JP | 2014046300 A | 3/2014 |
| JP | 2014046300 A | 3/2014 |
| KR | 100995759 B1 | 11/2010 |
| WO | 2010111378 A1 | 9/2010 |
| WO | 2012097388 A1 | 7/2012 |
| WO | 2012127150 A1 | 9/2012 |
| WO | 2012127150 A1 | 9/2012 |
| WO | 2013025888 A1 | 2/2013 |

OTHER PUBLICATIONS

Alkhudhiri et al, "Membrane distillation: A comprehensive review, Desalination", vol. 287, pp. 2-18 (2012).
Zhao et al, "Water regeneration from human urine by vacuum membrane distillation and analysis of membrane fouling characteristics", Separation and Purification Technology, vol. 118, pp. 369-376 (2013).
Chiari, "Air humidification with membrane contactors: experimental and theoretical results" International Journal of Ambient Energy, vol. 21, Issue 4, pp. 187-195 (2000).
Khayet et al, "Nature of flow on sweeping gas membrane distillation", Journal of Membrane Science, vol. 170, Issue 2, pp. 243-255 (2000).
Putnam, "Composition and concentrative properties of human urine" (NASA, Washington, 1971) p. 40—https://ntrs.nasa.gov/archive/nasa/casi.ntrs.nasa.gov/19710023044.pdf.
Hirabayashi, "Pervaporation Membrane System for the Removal of Ammonia from Water", Materials Transactions, vol. 43, Issue 5, pp. 1074-1077 (2002)—http://www.jim.or.jp/journal/e/pdf3/43/05/1074.pdf.
Takegami et al, "Pervaporation of ethanol/water mixtures using novel hydrophobic membranes containing polydimethylsiloxane", Journal of Membrane Science, vol. 75, Issues 1-2, pp. 93-105 (1992).
Satyanarayana et al, "Composite membranes for hydrophobic pervaporation: study with the toluene-water system", Chemical Engineering Journal, vol. 102, Issue 2, pp. 171-184 (2004).
Jullok et al, "A Biologically Inspired Hydrophobic Membrane for Application in Pervaporation", Langmuir, vol. 29, Issue 5, pp. 1510-1516 (2013).
Pronk et al, "Electrodialysis for recovering salts from a urine solution containing micropollutants", Environmental Science and Technology, vol. 40, Issue 7, pp. 2414-2420 (2006).
UKIPO Search Report dated Sep. 14, 2016 on GB 1603551.1.
UKIPO Search Report dated May 31, 2016 on GB 1603546.1.
International Search Report dated May 15, 2017 on PCT/EP2017/054816.
International Search Report dated Jun. 13, 2017 on PCT/EP2017/054820.
International Search Report and Written Opinion from PCT/EP2017/054820 dated Jun. 13, 2017 (17 pages).
International Search Report and Written Opinion from PCT/EP2017/054816 dated Sep. 4, 2018 (7 pages).

* cited by examiner

TOILET AND OPERATION THEREOF

CROSS-REFERENCE TO RELATED APPLICATION

This application is the U.S. national phase entry of PCT/EP2017/054820, with an international filing date of 1 Mar. 2017, which claims the benefit of Great Britain Patent Application Serial No. 1603551.1, with a filing date of 1 Mar. 2016, the entire disclosures of which are fully incorporated herein by reference.

BACKGROUND TO THE INVENTION

Field of the Invention

The present invention relates to a toilet and to the operation of such a toilet. The invention is particularly, but not exclusively, suitable for use at locations with little or no available power and/or sewage infrastructure, such as in some developing countries and/or in remote locations.

Related Art

Existing dry toilets, such as pit latrines and composting toilets, are often used in developing countries. They can be dug or manufactured without the need for specialist equipment, but produce unpleasant miasma. They are also unhygienic and unsanitary to use.

Existing chemical toilets provide some improvements over dry toilets, but still produce unpleasant odours and still suffer from hygiene and sanitation problems. Chemical toilets typically are emptied by hand, and the chemicals used can be harmful to the person emptying the toilet. Furthermore, chemical toilets can be expensive to install, and the chemicals used can be expensive to dispose of and replenish. The chemicals used can also be harmful to the environment if not disposed of correctly.

To spread the costs associated with installing and maintaining toilets in developing countries, toilets are often shared by many people. This sharing contributes to hygiene and sanitation problems. Furthermore, because of the unpleasant odour associated with such toilets, they tend to be in remote locations, rather than being in or close to homes. As such, people may have to walk a long way to access their nearest toilet, further decreasing the incentive to use a communal toilet.

It would therefore be desirable to provide a toilet that is inexpensive to purchase, install and maintain, whilst being capable of shielding the user from miasma and odour associated with the simple toilet solutions discussed above. In this way, it is preferred to develop a toilet that can be installed in a home, intended for the use of the occupiers of that home, which has no need of coupling to a sewer or a running water supply.

SUMMARY OF THE INVENTION

The present invention has been devised in order to address at least one of the above problems. Preferably, the present invention reduces, ameliorates, avoids or overcomes at least one of the above problems.

In a first aspect, the present invention provides a toilet having a bowl for receiving human waste and a wiper, wherein:

the bowl is moveable between a waste receiving position and a waste emptied position, said movement being provided based on a waste emptying actuation by a user of the toilet;

the wiper is movable to remove residual waste from an inside surface of the bowl by wiping the inside surface of the bowl; and the movement of the wiper is coupled to the movement of the bowl, the wiper being configured to move during movement of the bowl, for at least a part of the movement of the bowl between the waste receiving position and the waste emptied position.

In a second aspect, the present invention provides a method for operating a toilet, in which human waste is received in a bowl of the toilet, the method including the steps:

a user of the toilet performing a waste emptying actuation, thereby moving the bowl from a waste receiving position to a waste emptied position, emptying the waste from the bowl;

moving a wiper to remove residual waste from an inside surface of the bowl by wiping the inside surface of the bowl;

wherein the movement of the wiper is coupled to the movement of the bowl, the wiper moving during movement of the bowl, for at least a part of the movement of the bowl between the waste receiving position and the waste emptied position.

Accordingly, the bowl moving to empty waste and the wiper moving to remove residual waste from the inside surface of the bowl happens in a coordinated motion. The coupling of the movement of the bowl with the movement of the wiper enables the emptying and cleaning of the bowl to be driven with a single, user-friendly actuation. The emptying and cleaning need not require a complex mechanical operation, and the linking of the emptying and cleaning of the bowl means that provided the user performs the waste emptying actuation, the bowl will also be cleaned in the same operation. This ensures that the toilet will be in an acceptable state for the next user, in a manner analogous to flushing of a conventional water-based flushing toilet.

The first and/or second aspect of the invention may have any one or, to the extent that they are compatible, any combination of the following optional features.

It is intended that the bulk of the waste will empty under its own weight between the waste receiving position and the waste emptied position, typically when the bowl is at least half-way from the waste receiving position to the waste emptied position.

Conveniently, the movement of the bowl between the waste receiving position and the waste emptied position includes a rotational movement. This may be rotation about a fixed axis, or the axis may be movable to provide additional functionality, as discussed in more detail below.

The wiper may remain stationary during an initial stage of the movement of the bowl from the waste receiving position. For example, the wiper may begin to move after the received waste has been emptied from the bowl, but before the bowl reaches the waste emptied position. Preferably, the shape of the wiper is such that, and the movement of the wiper is controlled so that, the wiper is positioned out of the path of waste falling from the bowl. This configuration prevents the wiper from being contaminated with waste falling from the bowl.

A waste collection region is preferably located below the bowl to receive waste from the bowl. Means may be provided for onward conveyance, separation and/or treatment of the waste.

The bowl preferably forms a seal with a toilet pan when the bowl is in the waste receiving position. In this position, typically a rim of the bowl forms a seal against the toilet pan. For example, the bowl may be urged against the toilet pan to maintain the seal. By forming a seal between the bowl and the toilet pan when the bowl is in in the waste receiving position, it is possible to reduce or even eliminate odour from waste in the waste collection region from escaping the waste collection region.

The bowl preferably also forms a seal with a toilet pan when the bowl is in the waste emptied position. In this position, typically a surface of the bowl forms a seal against the toilet pan. For example, the bowl may be urged against the toilet pan to maintain the seal. By forming a seal between the bowl and the toilet pan when the bowl is in the waste emptied position, it is possible to reduce or even eliminate odour from waste in the waste collection region from escaping the waste collection region.

Preferably, during movement of the bowl between the waste receiving position and the waste emptied position, the bowl does not seal against the toilet pan. This is acceptable to the user, because odour control during the emptying of the bowl is less important given that there is waste in the bowl to be emptied. Nonetheless, because the bowl seals against the toilet pan when in both the waste receiving position and when the bowl is in the waste emptied position, the time for which the seal is not formed is minimised. Also, because the bowl will spend the majority of time in the waste receiving position and the waste emptied position, the time for which the seal is not formed is further minimised. Preferably a gap between the bowl and the pan while the bowl moves from the waste receiving position should be small if possible, in order to minimise the escape of odour from the waste collection region and also to avoid presenting the user with a direct view of the waste collection region. The form of the gap should, however, enable suitably free movement of the bowl relative to the toilet pan.

Optionally, the bowl may be resiliently biased away from the toilet pan, and urged against the toilet pan only when in the waste receiving position. The bowl may be resiliently biased away from the toilet pan by a spring, for example, or under the force of gravity.

The movement of the bowl may include a rotational movement. The movement of the wiper may also include a rotational movement. In particular where the bowl movement includes a rotational movement, rotational movement of the wiper enables the movement of the wiper and the bowl to be coupled via a particularly suitable mechanism.

Preferably, where the bowl moves via rotation, preferably the rotation of the bowl is less than 360°. Where the wiper moves via rotation, preferably the rotation of the wiper is less than 360°, more preferably less than 180°. In this case, the toilet can be made in a suitable overall size, because it is then not necessary to provide space under the toilet bowl suitable for the otherwise larger rotational range of the wiper.

A gear mechanism may facilitate the coupled movement of the bowl and the wiper. The gear mechanism may for example be provided by a bowl sprocket connected to the bowl and a wiper sprocket connected to the wiper, the bowl sprocket and the wiper sprocket being operatively coupled to each other. Teeth of the bowl sprocket may engage directly with teeth of the wiper sprocket. Alternatively, teeth of the bowl sprocket may engage with teeth of the wiper sprocket via one or more additional components such as additional gear sprockets.

During the cooperating movement of the bowl and the wiper, and where the bowl rotates and the wiper rotates, the gear mechanism between the bowl and the wiper may provide a gear ratio (rotational speed of bowl (input) divided by the rotational speed of the wiper (output)) of less than one.

Where the gear mechanism comprises a bowl sprocket and a wiper sprocket, the radius of the bowl sprocket may be larger than the radius of the wiper sprocket.

The bowl sprocket may have teeth formed at only part of its circumference, intended to mesh with cooperating teeth on the wiper sprocket. The wiper sprocket may also have teeth formed at only part of its circumference. By having no teeth on an incomplete part of the circumference of the bowl sprocket, it is possible for the wiper to only move for an incomplete part of the rotation of the bowl. The gear mechanism discussed above achieves all of this with a simple gear mechanism that is inexpensive to manufacture and straightforward to service and maintain. Furthermore, the motion can be driven by a single actuation means directly driving rotation of either the bowl or the wiper. As such, the coordinated motion of the bowl and the wiper can be easily operated by a user.

At least one of the wiper sprocket and the bowl sprocket may have a radius which varies with position around the circumference of the sprocket. This variation of the radius is intended to be different from the routine variation provided by the gear teeth. Additionally or alternatively, at least one of the wiper sprocket and the bowl sprocket may be eccentric. Preferably, at least one of the wiper sprocket and the bowl sprocket may have an increased radius for an incomplete part of its circumference. More preferably, the wiper sprocket may have an increased radius for an incomplete part of its circumference, preferably at a part of the sprocket where gear teeth are not formed. Advantageously, the wiper sprocket may have a first radius for a first part of its circumference and a second radius for a second part of its circumference, where the second radius is larger than the first radius. The axis about which the bowl rotates may be displaceable.

By having an increased radius for a part of one of the sprockets, the displaceable axis of the bowl may be displaced when the raised part of that sprocket comes into contact with the opposing sprocket. This configuration can be used to urge the bowl against the toilet pan, thereby providing the seal when the bowl is in the waste receiving position. In effect, the raised part of the sprocket acts as a cam against the other sprocket.

The wiper sprocket may have no teeth on the part of its circumference with the increased radius. Preferably, the wiper sprocket may have no teeth on the second part of the circumference having the second radius. Such a configuration can be used so that the wiper remains stationary when the bowl is in the waste receiving position and forms the seal with the toilet pan.

The waste emptying actuation may be provided by a manual drive means. Moreover, the movement (such as rotational movement) of the bowl may be driven manually. Preferably, the movement (such as rotational movement) of the bowl may be driven manually by the action of closing a lid of the toilet. The lid of the toilet may be hinged to allow rotational movement between an open position and a closed position, with the lid covering the toilet pan in the closed position in a manner familiar from a conventional flush toilet. There may of course be a seat provided on the pan, the seat also optionally being hinged to allow rotational movement between an open position and a closed position.

In order to drive the rotation of the bowl, there may be provided a crank arm connected at a first end to the toilet lid and at a second end to the bowl sprocket.

Accordingly, the waste emptying actuation of opening and closing of the toilet lid can be used to operate the coordinated movement of the bowl and the wiper. The coupling of the wiper movement to the bowl movement means that a separate waste emptying actuation is not needed to drive the wiper, separately to the bowl.

The action of opening and closing the lid of the toilet lid may drive one or more further moving parts of the toilet, the further moving part(s) of the toilet being separate from the bowl and wiper. The further moving part(s) of the toilet may operate to transport waste out of the waste collecting region beneath the bowl.

Accordingly, the single user actuation of closing the toilet lid can drive both the emptying and cleaning of the bowl, and the removal of waste from the waste collection area.

Preferably, the movement of the wiper relative to the bowl is a substantially cardioid-shaped movement. This permits a relatively simple mechanism for moving the wiper relative to the bowl but also permits the depth of the bowl to be relatively large, and yet still the bowl surface can be fully wiped by the wiper.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
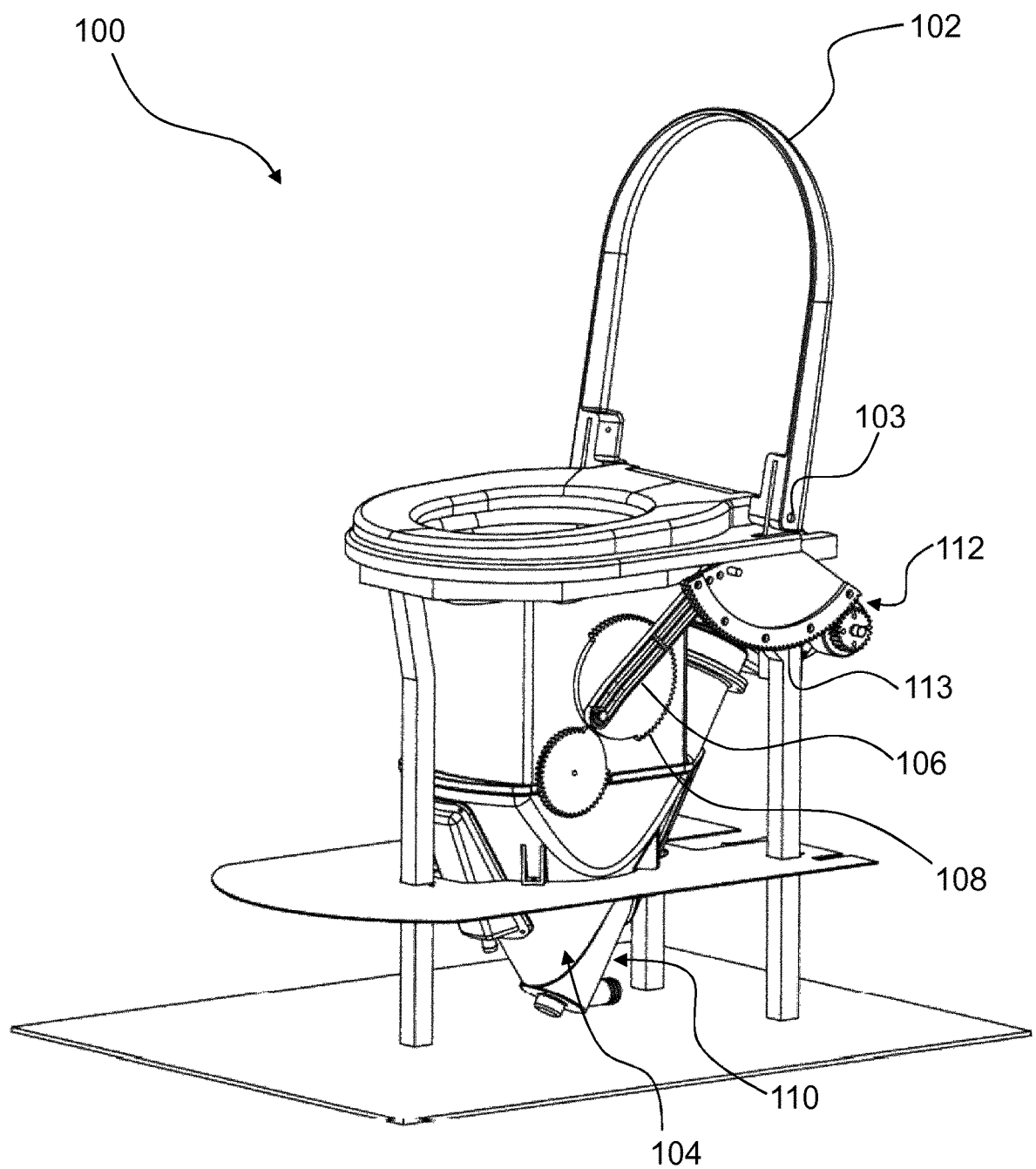
FIG. 1 shows a schematic perspective view of a toilet according to an embodiment of the present invention, without an external cover.
Figure 2:
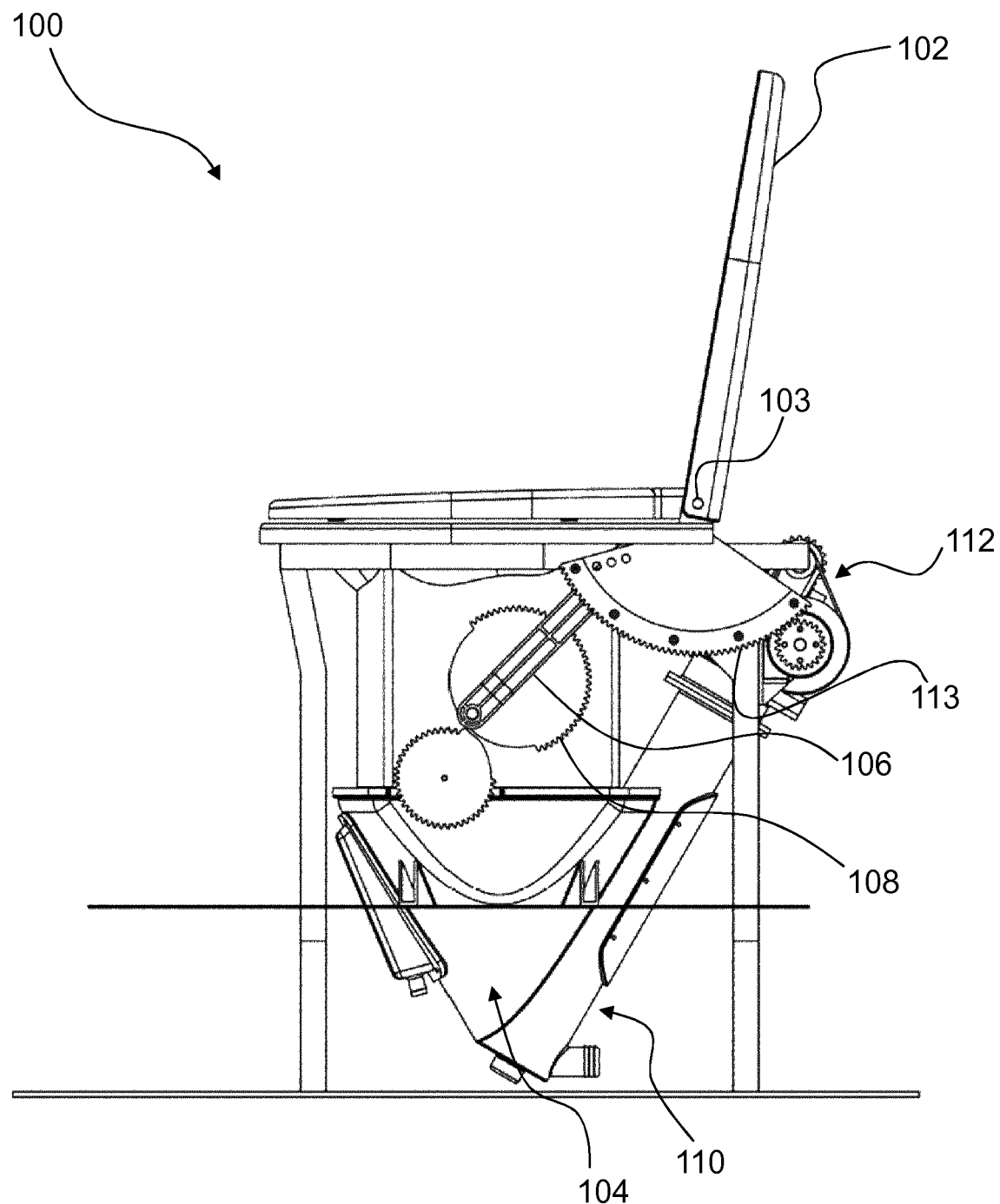
FIG. 2 shows a side-view of the toilet of FIG. 1.
Figure 3:
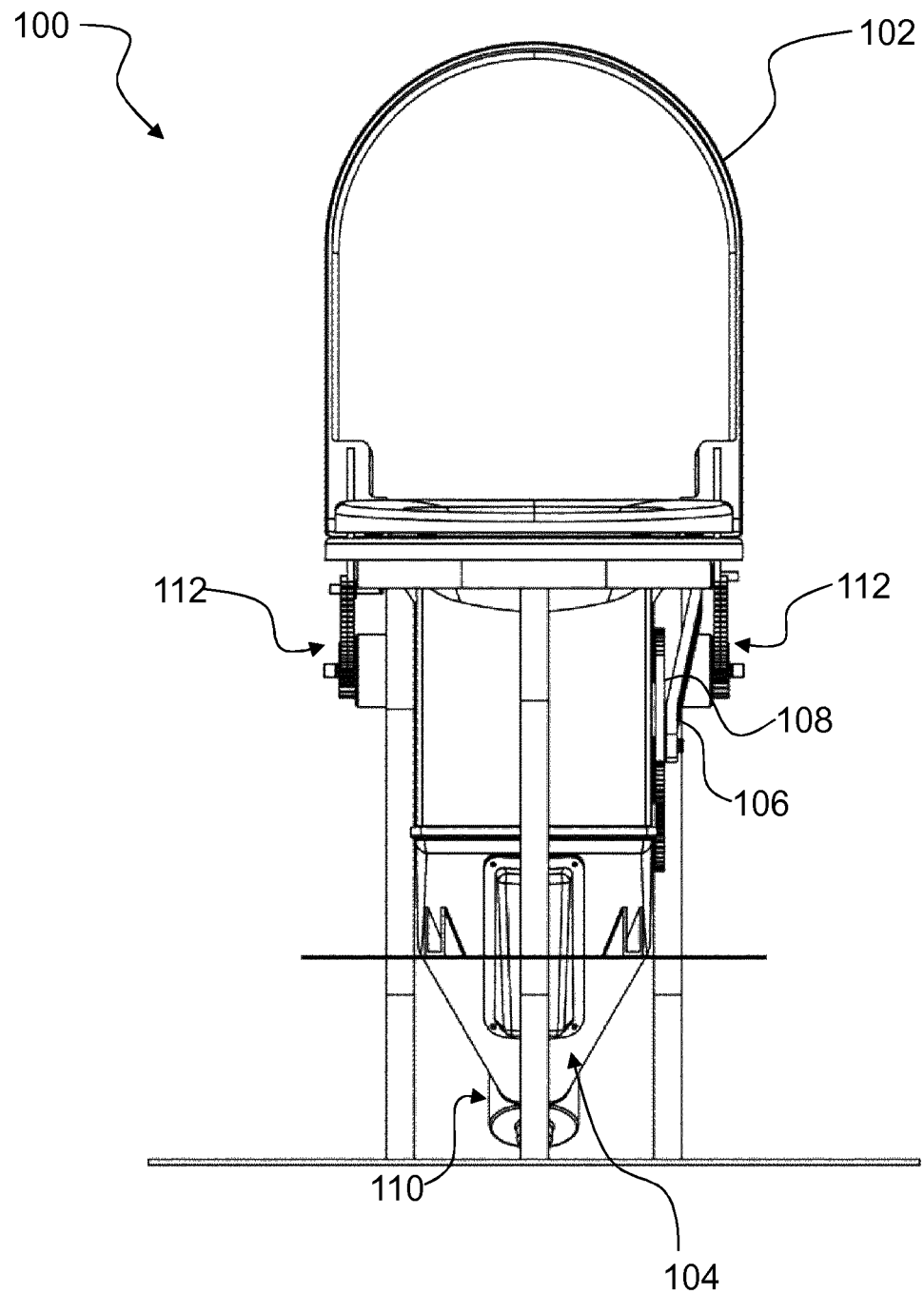
FIG. 3 shows a front-view of the toilet of FIGS. 1 and 2.

FIGS. 1 to 3 show a toilet 100 according to an embodiment of the present invention. As can be seen from these figures, the toilet is freestanding and has a compact design. It can be used without the need for an external electrical power supply, or an external source of water.

Instead of using external water and power, the toilet 100 has a cleaning mechanism that is actuated through the opening and closing of the lid 102 of the toilet, which is attached to the toilet by a hinge 103. The toiled has a self-contained liquid reservoir and waste collection region 104. The operation of the toilet of FIGS. 1 to 3 is discussed in more detail below.

A crank arm 106 is connected at a first end to the toilet lid 102 and at a second end to a bowl sprocket 108 of a bowl and wiper arrangement (not shown in FIGS. 1-3). Opening and closing the toilet lid 102 therefore causes a rotation of the bowl sprocket 108, which in turn moves the bowl and wiper arrangement. When the lid of the toilet 102 is in the open position, the bowl is in a waste receiving position. When the toilet lid 102 is moved from the open position to the closed position, the crank arm 106 rotates the bowl sprocket 108, thereby driving the operation of the bowl and wiper arrangement so that the bowl is moved to a waste emptied position and cleaned, with the waste previously received by the bowl is emptied into the waste collection region 104. When the toilet lid 102 is opened again for the next use, the bowl is returned to the waste receiving position. Hence, the closing of the toilet lid 102 is a waste emptying actuation, driving the emptying and cleaning of the toilet bowl. Other waste emptying actuations could be used in place of the opening and closing of the toilet lid. For example, a user could rotate a separate handle, could press a button to activate an electric motor, or could wave a hand in front of a known type of sensor (e.g. an optical or infra red sensor) to activate an electric motor. An exemplary arrangement and operation of the bowl and wiper is discussed in more detail below.

Once the bowl has been moved to the waste emptied position, and the waste emptied into the waste collection region 104, the solid parts of the waste collect at the bottom of the waste collection region 104. The liquid above the solid parts of the waste can then be treated, and clean water can extracted. As well as driving the rotation of the bowl sprocket 108, closing the toilet lid 102 operates a further moving part of the toilet separate from the bowl and wiper. In particular, the closing of the toilet lid 102 drives screw conveyor 110 via a gear mechanism 112. The turning of the screw conveyor 110 transports waste out of the waste collection region 104 by lifting the solids out of the waste collection region 104, and onwards for storage or treatment.

In order to drive both the rotation of the bowl sprocket 106 and the screw conveyor 110, a wedge-shaped sprocket 113 attached to the toilet lid 102 is provided. Crank arm 106 is attached at its first end to toilet lid 102 via wedge-shaped sprocket 113, and the teeth of gear mechanism 112 engage with the teeth of wedge-shaped sprocket 113. Accordingly, when the toilet lid 102 is opened or closed, wedge-shaped sprocket 113 rotates about the hinge 103. As the wedge-shaped sprocket 113 rotates, the crank arm 106, which is connected to the wedge-shaped sprocket 113, causes rotation of bowl rotor 106. Simultaneously, wedge-shaped sprocket 113 causes a rotation of gear mechanism 112, thereby driving screw conveyor 110. Accordingly, through the wedge-shaped sprocket 113, all three of the rotation of the bowl, the movement of the wiper, and the driving of the screw conveyor, are operated by the single action of closing (and opening) the toiled lid 102.

FIGS. 4A to 4E show the arrangement and operation of a bowl 400 and wiper 402 according to an embodiment of the present invention. In the embodiments discussed below, the movements of the bowl 400 and wiper 402 are rotational movements. As will be understood from the following description, this rotational movement allows for a simple mechanical operation of the movement of the bowl and wiper. It will nonetheless be appreciated that other forms of movement, such as such as a translation, or a combination of a translation and a rotation, could be used for the movement of the bowl 400 and wiper 402.

Bowl 400 has a bowl sprocket 404 attached to it. Wiper 402 has a wiper sprocket 406 attached to it. Rotation of the bowl sprocket 404 drives rotation of the bowl 400. Rotation of the wiper sprocket 406 drives rotation of the wiper 402.

The bowl sprocket 404 is in direct contact with wiper sprocket 406 in the embodiment of FIGS. 4A to 4E. Bowl sprocket 404 has teeth 408 formed at only a part of its circumference and wiper sprocket 406 has teeth 408 formed at only a part of its circumference. The teeth 408 of bowl sprocket 404 engage directly with the teeth 408 of wiper sprocket 406 when bowl 400 rotates. Accordingly, the rotation of the bowl 400 and bowl sprocket 404 is coupled to the rotation of the wiper 402 and wiper sprocket 406. The skilled person will understand there are many other ways in which the motion of the bowl sprocket 404 can be coupled to the motion of the wiper sprocket 406, some of which would not require the bowl sprocket 404 and wiper sprocket 406 to be in direct contact with each other, for example when the bowl sprocket 404 and wiper sprocket 406 engage via one or more additional gear sprockets. In certain embodiments, the coupling of the motion of the bowl 400 with the wiper 402 may not even require the use of sprockets. For example, a belt-drive system could be used.

As discussed above, part of the circumference of the bowl sprocket 404 does not have teeth on it and is smooth, and part of the circumference of the wiper sprocket 406 does not have teeth on it and is smooth. Accordingly, the rotation of the wiper 402 is coupled to the rotation of the bowl 400 in such a way that the wiper 402 moves during the movement of the bowl 400 for a part of the rotation of the bowl 400, but the wiper 402 does not move for another part of the rotation of the bowl 400.

Figure 4A:
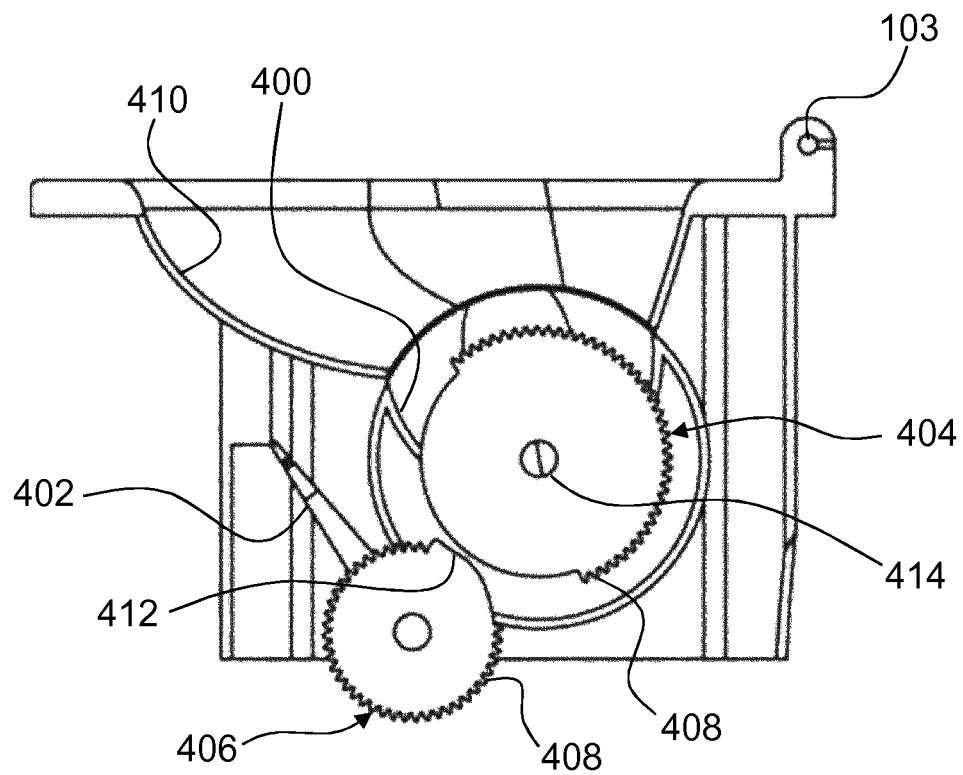
FIGS. 4A to 4E show the arrangement and operation of a bowl and wiper of a toilet according to an embodiment of the present invention.

In FIG. 4A the bowl 400 is in a waste receiving position for receiving human waste, with the bowl in a substantially upright orientation and the wiper pointing in a substantially upwards direction. The bowl 400 is positioned at the bottom of toilet pan 410, so that it receives any waste falling into the toilet pan 410. With reference to FIGS. 1 to 3, the bowl 400 would be in this waste receiving position when the toilet lid 102 is in the open position. While the toilet is being used, the bowl 400 would be left in the waste receiving position of FIG. 4A, with the toilet lid open.

Once the toilet has been used and the waste has been received in the bowl 400, a user can empty and clean the bowl 400 by causing the bowl to move from the waste receiving position to a waste emptied position, e.g. by providing a waste emptying actuation. This waste emptying actuation may be provided by moving the toilet lid from the open position to the closed position, such as is discussed in relation to the embodiment of FIGS. 1 to 3 above. Alternatively, the actuation may be provided by a user operating a different manual drive means, such as by driving a manual crank (not shown in any of the figures). Alternatively, the user may press a button to operate an electric motor coupled to the bowl and wiper, or may wave a hand in front of a sensor to operate an electric motor. The manual or electric drive means may be connected to the bowl 400 or bowl sprocket 404, and drive the rotation of the wiper 402. Alternatively, the manual or electric drive means may be connected directly to the wiper 402 or wiper sprocket 406, and drive the rotation of the bowl 400.

For simplicity of description, in the following embodiments the rotation of the bowl 400 and the wiper 402 is discussed in the context of the waste emptying actuation being provided by a closing (and opening) of a toilet lid, such as was discussed in relation to FIGS. 1 to 3. It will however be understood that the rotation of the bowl and wiper could equally be driven by moving a manual or electronic drive means between a first position (analogous to the open position of the toilet lid) and a second position (analogous to the closed position of the toilet lid).

Figure 4B:
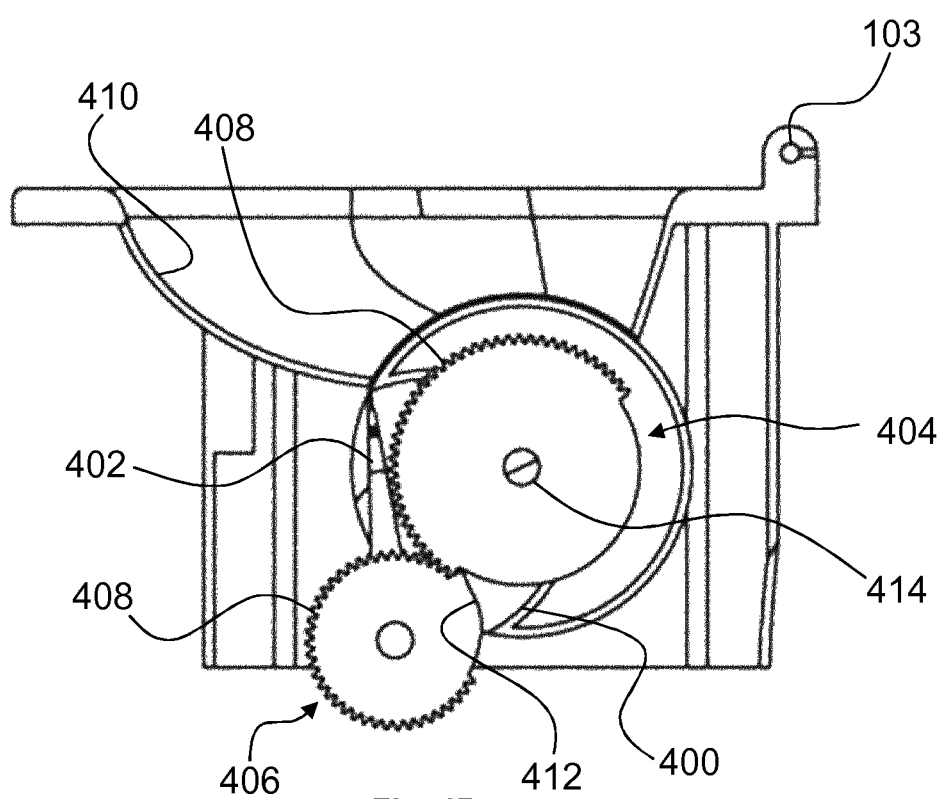
Figure 4C:
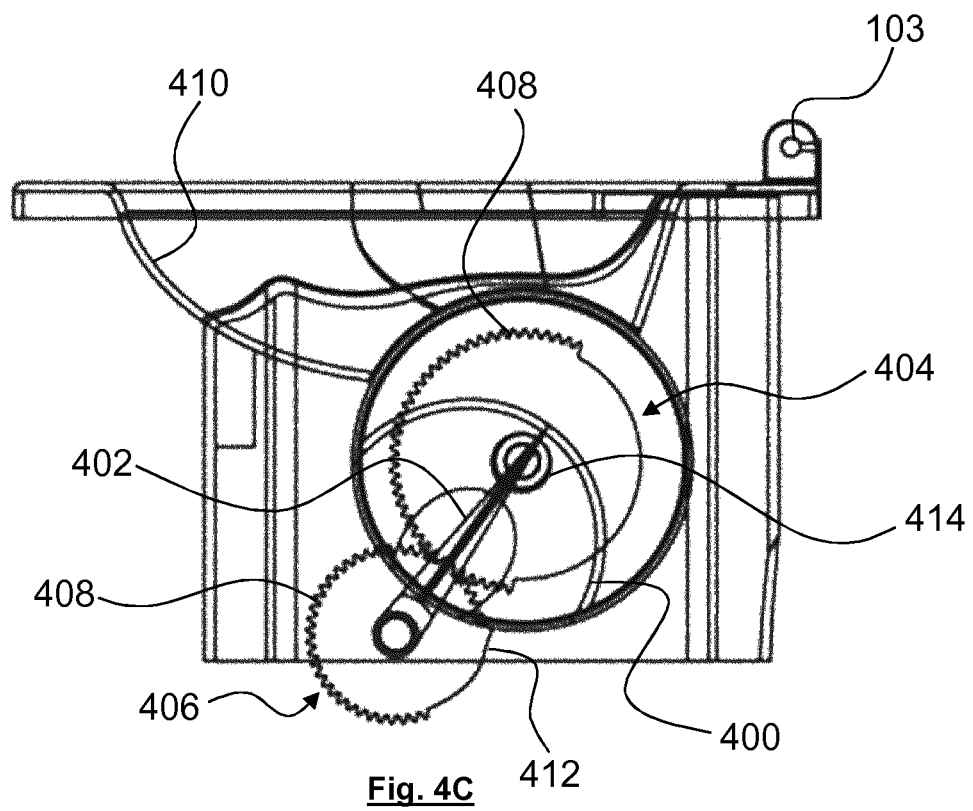
Figure 4D:
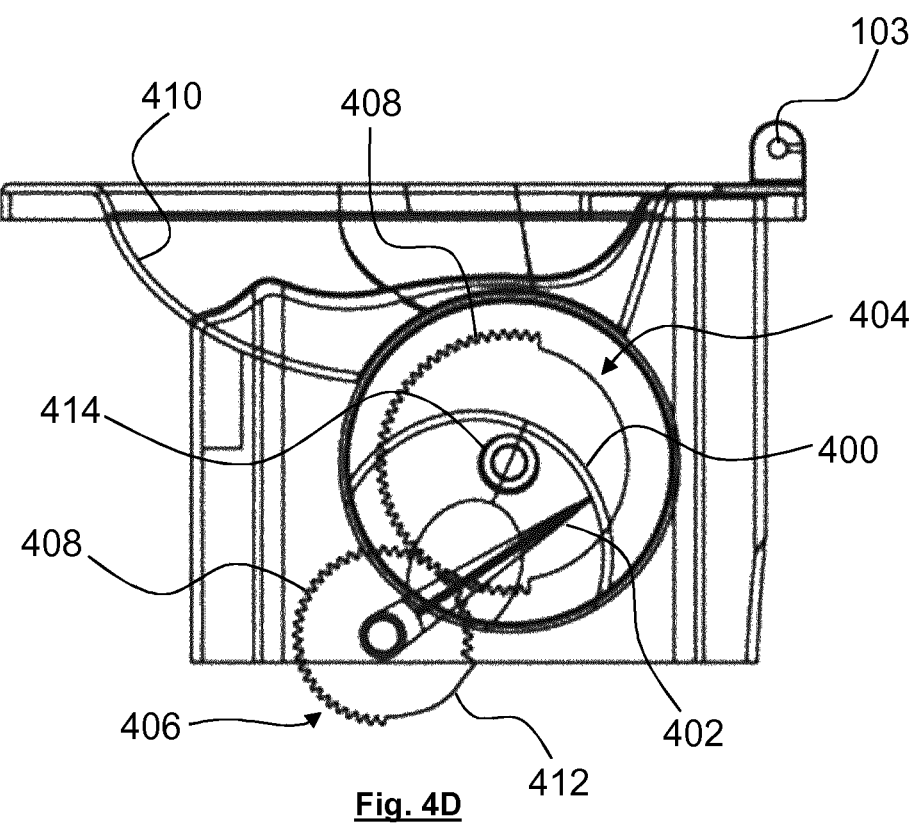

FIG. 4A shows the bowl in a waste receiving position, with the toilet lid open. Once all waste has been received in the bowl, a user will begin to close the toilet lid. As the toilet lid is closed, the bowl 400 rotates towards the front of the toilet. Alternatively, the bowl could rotate towards the back of the toilet. For the first part of the rotation of the bowl 400, the wiper 402 remains stationary. This is due to the fact that there are no teeth 408 on part of the circumference of the bowl sprocket 404 that is contact with the wiper sprocket 406. After rotating by an angle, defined here as being between $\theta_1$ and $\theta_2$ from the waste receiving position, a teeth engagement angle will be reached, as shown in FIG. 4B, at which the teeth 408 of the bowl sprocket 404 first engage with the teeth 408 of the wiper sprocket 406. $\theta_1$ may be 50°. $\theta_2$ may be 130°. Preferably, $\theta_1=60°$, more preferably $\theta_1=70°$ and most preferably, $\theta_1=80°$. Preferably, $\theta_2=120°$, more preferably, $\theta_2=110°$ and most preferably $\theta_2=100°$. Any suitable combination of $\theta_1$ and $\theta_2$ may be used. Advantageously, the teeth engagement angle is reached after the bowl has turned through a large enough angle for the bulk of the waste to have been emptied (fallen) from the bowl 400 under its own weight, and transferred into a waste collection region, such as region 104 of FIGS. 1 to 3. In this way, the wiper remains stationary in the substantially upright position and out of the path of the falling waste, until the bulk of the waste has fallen from the bowl. Residual waste may remain stuck to the inside surface of the bowl, even after the teeth engagement angle has been reached and the bulk of the waste has fallen from the bowl.

Figure 4E:
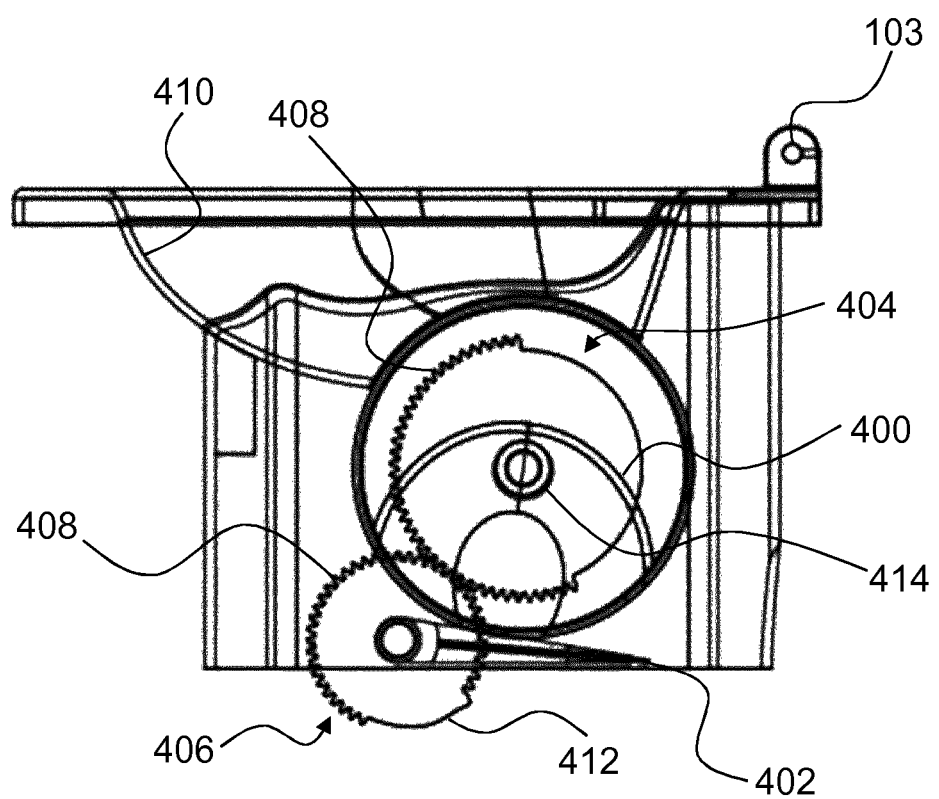

After the teeth engagement angle is reached, and as the toilet lid is closed further by the user, the bowl continues to rotate in the same direction. Given that the teeth 408 of the bowl sprocket 404 and wiper sprocket 406 are now engaged, the rotation of the bowl 400 now drives a rotation of the wiper 402. As shown in the embodiment of FIGS. 4A to 4E, the wiper gradually 402 rotates in the opposite direction to the bowl 400. As the wiper rotates in the opposite direction to the bowl, the tip of the wiper wipes along the inside surface of the bowl, so as to remove residual waste from the inside of the bowl, for example waste that may have become stuck to the inside surface of the bowl. The bowl 400 and wiper 402 continue to rotate until a waste emptied position has been reached, as shown in FIG. 4E, at which point the tip of the wiper has removed residual waste from the entire inside surface of the bowl, such that the bowl is fully emptied and cleaned. As can be seen from FIG. 4E, when the wiper and bowl have reached the waste emptied position, the tip of the wiper will have moved past the rim of the bowl, such that the middle point of the wiper has removed residual waste from the side-wall of the bowl. The bowl emptied position is reached when the toilet lid reaches the lid closed position. Preferably, the bowl 400 is in a substantially upturned position when the lid has reached the closed position. The bowl may have rotated through an angle of between $\theta_3$ and $\theta_4$ from the waste receiving position, where $\theta_3=160°$ and $\theta_4=200°$. Preferably, $\theta_3=170°$. Preferably, $\theta_4=190°$.

After the lid has been closed, the bowl 400 emptied, and the inside surface of the bowl 400 cleaned by the wiper 402, the toilet is ready for another use. To use the toilet again, a user simply lifts the lid, returning it to the open position.

This action returns the bowl 400 and wiper 402 into the waste receiving position (i.e. the configuration of FIG. 4A), as described above. When returning to the waste receiving position, the bowl 400 and wiper 402 may retrace the path they took in moving to the lid closed position. For example, if the bowl 400 rotated anticlockwise and the wiper 402 rotated clockwise when moving to the waste emptied position with the lid closed, then the bowl 400 would turn clockwise and the wiper anticlockwise when returning to the waste receiving position with the lid open. By having the wiper 402 rotate in the reverse direction when returning to the waste receiving position, the volume of the toilet unit can be reduced, as it is not necessary to provide space in the waste collection region beneath the bowl 400 and toilet pan 410 for a full 360° rotation of the wiper. In alternative embodiments, when the lid is opened, the bowl 400 and wiper 402 may continue to rotate in the same direction that they were rotating when the lid was being closed, thereby completing a full 360° rotation in a single cycle of closing and opening the toilet lid.

Figure 5A:
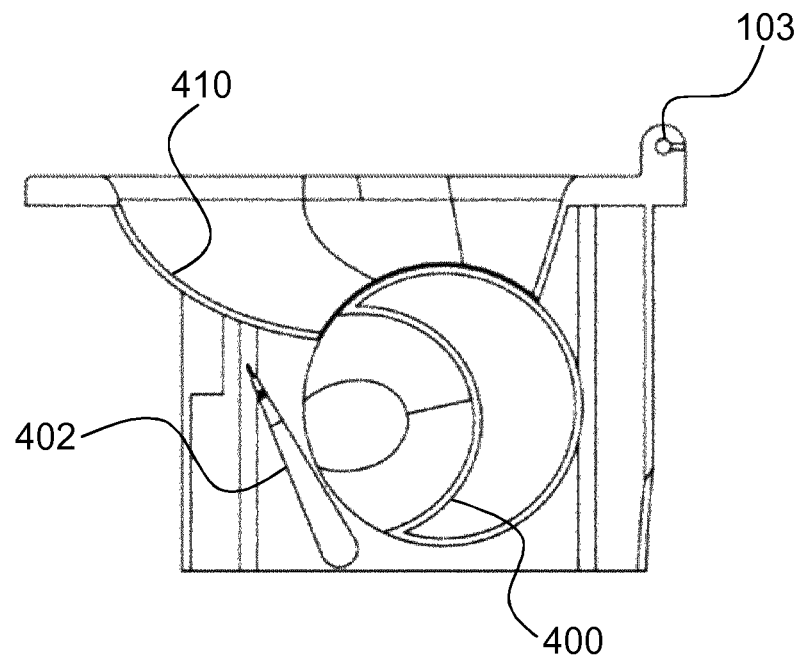
FIGS. 5A to 5D show the bowl and wiper of FIGS. 4A to 4E, with the gear mechanism not shown.
Figure 5B:
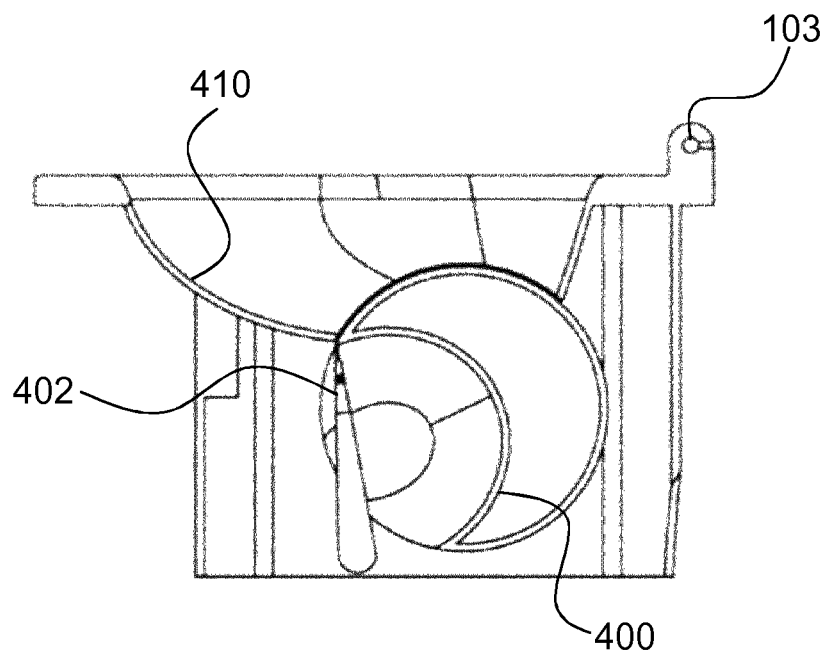
Figure 5C:
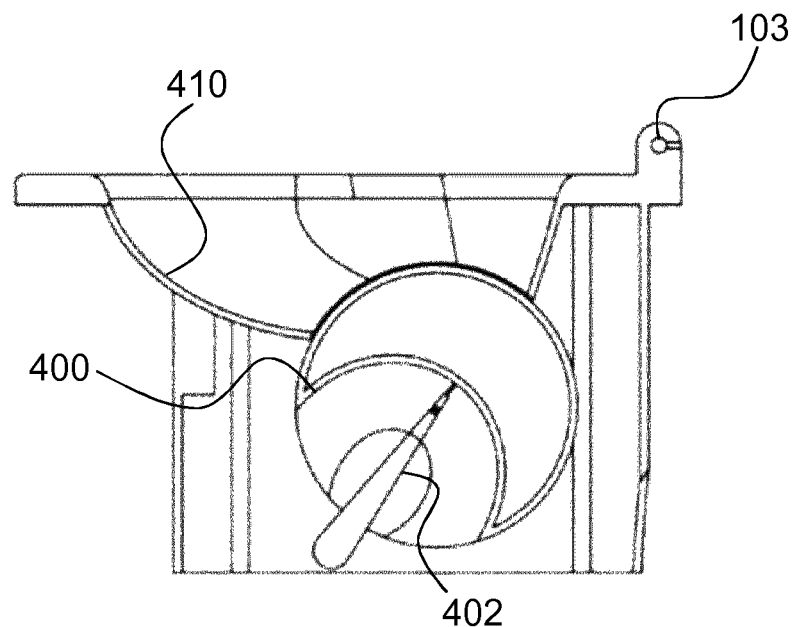
Figure 5D:
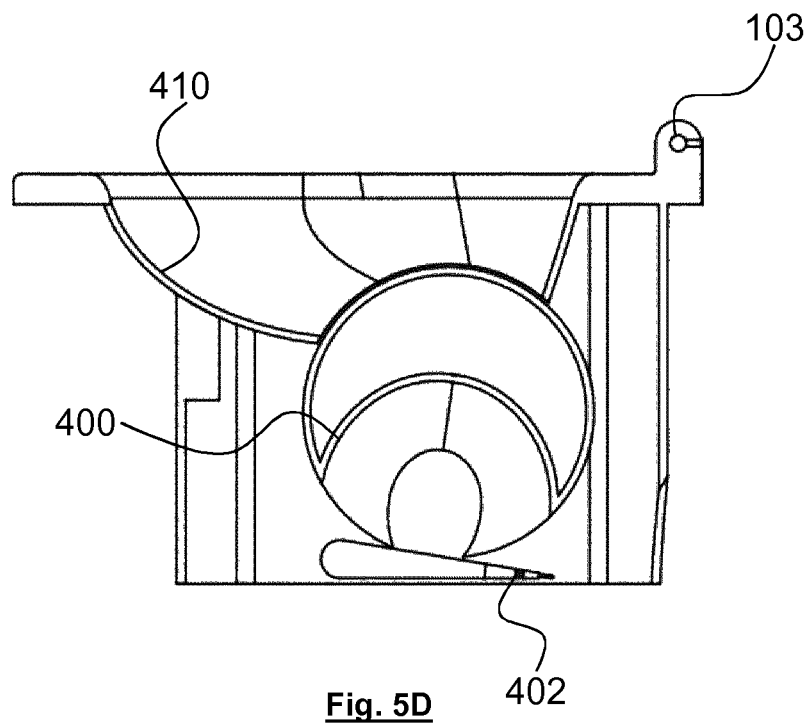

FIGS. 5A to 5D show the same bowl 400 and wiper 402 as in FIGS. 4B to 4E. The bowl sprocket 404 and wiper sprocket 406 are not shown, so that the relative movement of the wiper and bowl can be seen more easily. FIG. 5A shows the bowl 400 and wiper 402 position at a point of rotation intermediate between the positions shown in FIG. 4A and FIG. 4B. FIG. 5B shows the bowl 400 and wiper 402 position at the same point of rotation as FIG. 4B. FIGS. 5C and 5D show the bowl 400 any wiper 402 position at a point of rotation intermediate between FIGS. 4B and 4E.

Figure 6A:
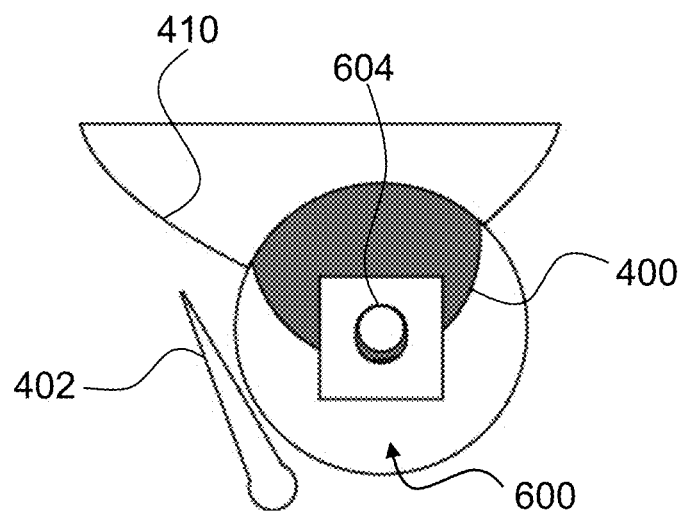
FIGS. 6A to 6C show the operation of a sealing mechanism for forming a seal between a rim of a bowl, and a toilet pan of a toilet, according to an embodiment of the present invention.
Figure 6B:
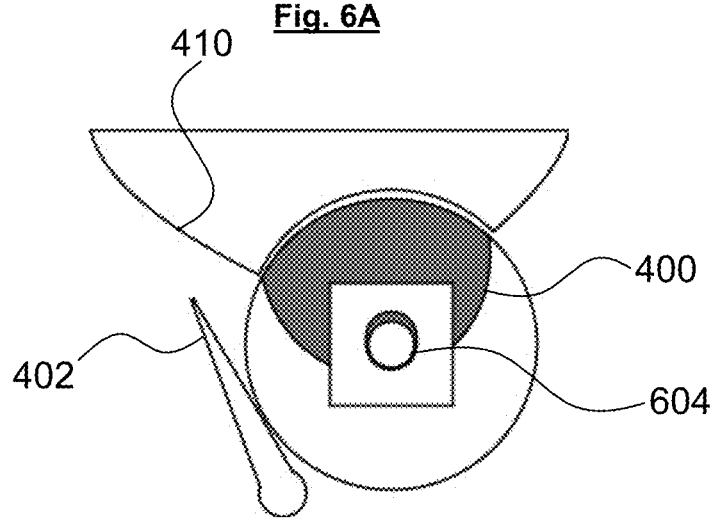
Figure 6C:
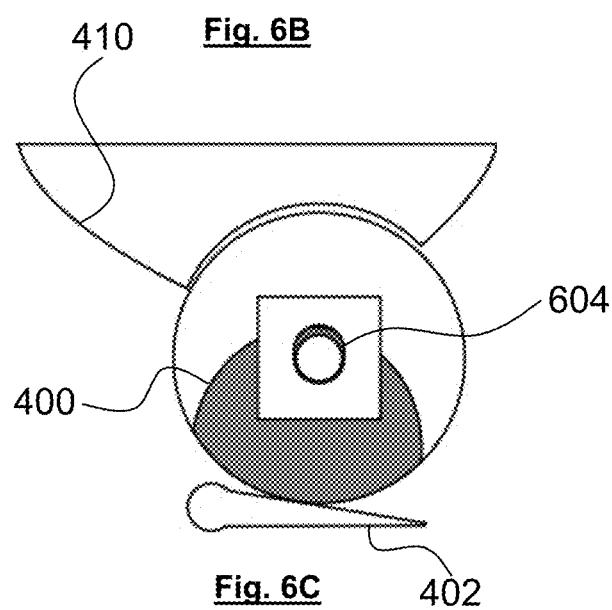

FIGS. 6A to 6C show an example of a sealing function for providing a seal between the bowl 400 and toilet pan 410, which may be used with any of the embodiments described above. FIG. 6 shows a bowl 400 and wiper 402 in a waste receiving position. FIG. 6B shows the bowl 400 and wiper 402 immediately after the waste receiving position, and FIG. 6C shows the bowl 400 and wiper 402 in the waste emptied position, with the toilet lid in the closed position.

When the bowl 400 is in the waste receiving position of FIG. 6A, the bowl is urged against the toilet pan 410, as indicated by arrow 600, so that a rim of the bowl forms a seal against the toilet pan 410. Preferably, the bowl 400 is forcibly urged against the toilet pan 410, so that a rim of the bowl 400 forms a tight seal against the toilet pan 410. In this way, when the bowl is in the waste receiving position, any unpleasant odours are sealed in the waste collection region below the toilet pan 410. The bowl 400 may only be urged into contact with the toilet pan 410 when the bowl 400 is in the waste receiving position.

When the bowl is rotated away from the waste receiving position, the bowl 400 is no longer urged into contact with the toilet pan 410, causing the bowl 400 to naturally move out of contact with the toilet pan 410 under the force of gravity, so that a small gap exists between the bowl 400 and the toilet pan 410. Alternatively, the bowl 400 may be resiliently biased out of contact with the toilet pan 410, e.g. by a spring, so that the bowl 400 is biased out of contact with the toilet pan 410 when the bowl 400 is not in the waste receiving position.

Once the bowl 400 has rotated away from the waste receiving position, it may remain out of contact with the toilet pan 410 until it has reached the waste emptied position of FIG. 6C, at which point the bowl may be once again urged into contact with the toilet pan 410, so that a seal between the bowl and the toilet pan is once again formed. Accordingly, the bowl is able to rotate freely to empty waste, without snagging or rubbing against the toilet pan, but provides a seal preventing unpleasant odours from escaping from the waste collection region while it is stationary in both the waste receiving and waste emptied positions. Advantageously, there may only be a small gap between the bowl 400 and the toilet pan 410 when the bowl is rotating. In this way, the bowl 400 and toilet pan 410 still provide a partial barrier preventing unpleasant odours from escaping from the waste collection region beneath the bowl 400 and toilet pan 410 when the bowl is rotating.

In embodiments where the rotation of the bowl is actuated by the opening and closing of a toilet lid, as discussed above, a seal will be formed when the toilet lid is in the open position (with the bowl in the waste receiving position) and the closed position (with the bowl in the waste emptied position), so that unpleasant odours cannot escape the waste collection area regardless of whether the toilet seat is left in the up position or the down position between uses.

Preferably, in embodiments in which the bowl moves out of contact with the toilet pan 410 when it rotates, the gap between the bowl and the toilet pan is less than 2 cm. More preferably, the gap is less than 1 cm. Yet more preferably, the gap is less than 5 mm. Even more preferably, the gap is less than 2 mm. Most preferably, the gap is less than 1 mm. As will be understood, the small gap reduces the odours which can pass. The lower limit of the gap is set by manufacturing tolerances.

The bowl 400 may be movable in the vertical direction in order to enable it to be urged into contact and out of contact with the toilet pan 410. As shown in FIGS. 6A to 6C, this vertical movement may be enabled by having an axis of rotation 604 of the bowl that can be displaced/translated.

Returning to FIGS. 4A to 4E, it will be noted that these figures also show an exemplary configuration for enabling the bowl 400 to be urged against the toilet pan 410 to form a seal, in a similar way to that shown in FIGS. 6A to 6C. In particular, these figures show the wiper sprocket 406 as having an increased radius 412 for the part of the circumference of the sprocket that does not have teeth 408. The part of the circumference of the wiper sprocket 406 with the increased radius 412 is in contact with the bowl sprocket when the wiper 402 and bowl 400 are in the waste receiving position. Accordingly, the part of the wiper sprocket 406 with the increased radius 412 causes the bowl 400 to be urged against the toilet pan 410 when the bowl 400 is in the waste receiving position. When the bowl 400 starts to rotate, the wiper 402 is soon rotated such that the part of the circumference of the wiper sprocket 406 with the increased radius 412 is no longer against the bowl sprocket 404, and the bowl 400 moves out of contact with the toilet pan 410 under the natural force of gravity. Optionally, the bowl may be resiliently biased out of contact with the toilet pan, for example by a spring (not shown).

Alternatively, it may be the bowl sprocket 404 which has an increased radius for the part of its circumference with no teeth. As the skilled person will understand, this would achieve the same effect of urging the bowl 400 into contact with the toilet pan 410 when the part of the circumference of the bowl sprocket 404 with the increased radius is in direct contact with the wiper sprocket 406.

To enable the bowl 400 to be moved towards and away from the toilet pan 410, the axis of rotation 414 of the bowl may be displaceable/translatable. For example, the axle on which the bowl 400 is mounted may be translatable.

Figure 7:
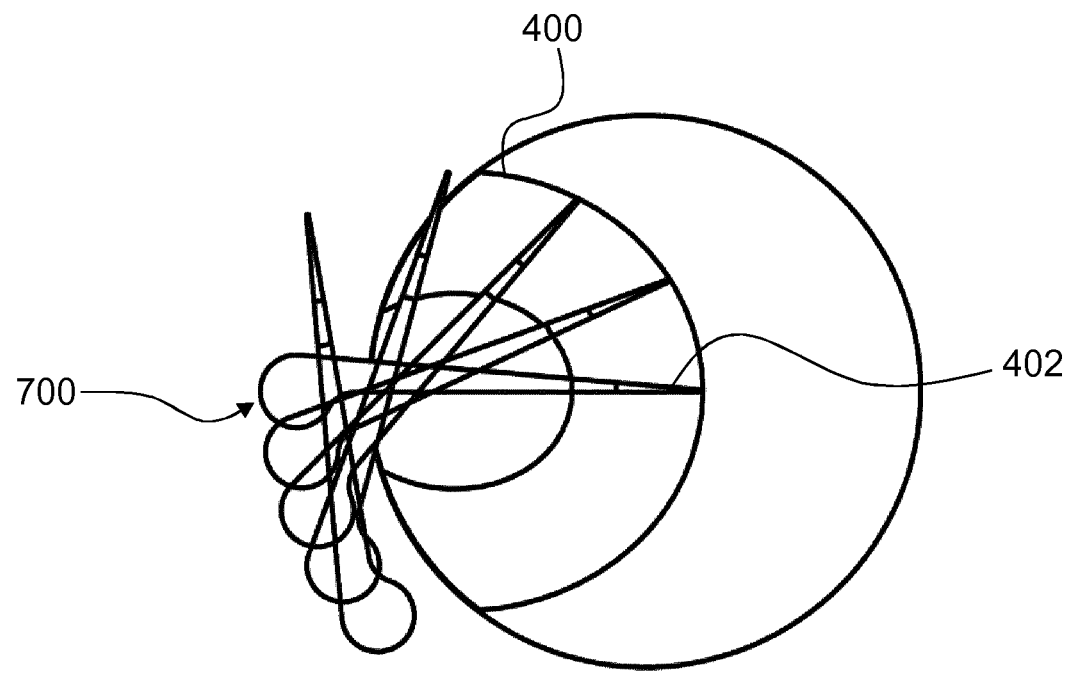
FIG. 7 shows the movement of the wiper viewed from a reference frame in which the bowl is stationary.

FIG. 7A shows positions of the wiper 402 according to an embodiment of the present invention, as it moves to remove waste from the inside surface of the bowl 400, viewed from a reference frame in which the bowl 400 is stationary. As can be seen from FIG. 7, the centre of rotation 700 of the wiper is not fixed in the reference frame in which the bowl 400 is stationary, but rather is translated as the tip of the wiper moves along the inside surface of the bowl 400. This feature enables the bowl 400 to be deeper in cross-section than it would be if the point of rotation of the wiper 402 was fixed in the reference frame in which the bowl is stationary. In particular, for a given diameter of the opening of the bowl 400, the bowl can be deeper in cross-section than it would be if the centre of rotation of the wiper was fixed, whilst still enabling residual waste to be removed from the entire inside surface of the bowl by the wiper 402.

Figure 8:
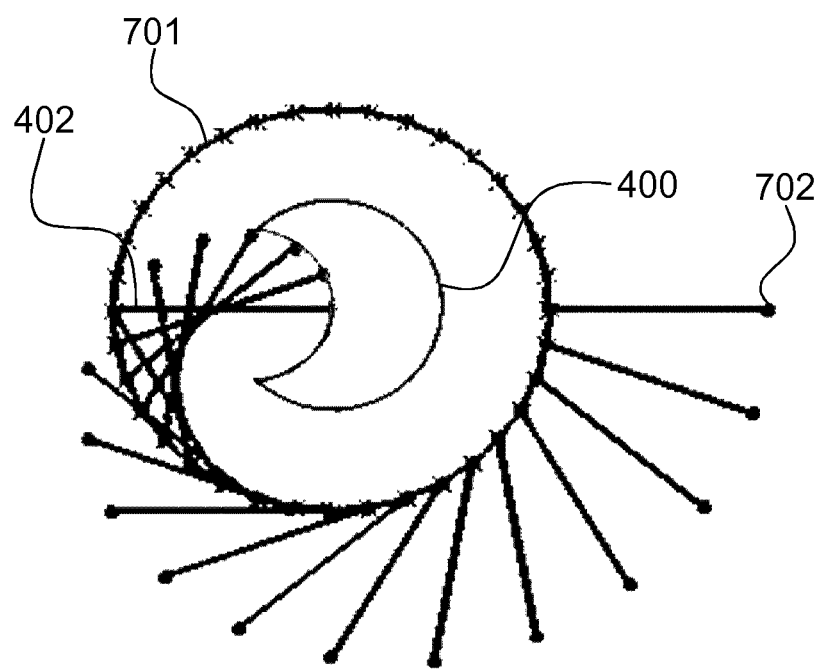
FIG. 8 shows a cardioid-shaped path of the movement of the wiper, viewed from a reference frame in which the bowl is stationary.

FIG. 8 shows the path that the wiper 402 would follow in the reference frame of FIG. 7, if the motion of the wiper were to continue along the same path as that shown in FIG. 7. The wiper is longer relative to the bowl in FIG. 8 than it is in FIG. 7, but the geometry of the movement is substantially the same. The circle 701 surrounding the bowl 400 of FIG. 8 shows how the centre of rotation of the wiper moves, viewed from the reverence frame of FIG. 7. As can be seen by the path shown of FIG. 8, the wiper tip 702 follows a cardioid-shaped path. Without wishing to be bound by theory, it is thought that the cardioid path is particularly effective for increasing the depth of the bowl 400 while still enabling waste to be removed from an inside surface of the bowl 400.

Not only does the cardioid-shaped wiper path discussed above enable the bowl 400 to be deeper, but it enables the coordinated relative movements of the bowl 400 and the wiper 402 to be achieved with a simple gear mechanism, such as the gear mechanism discussed in the embodiment of FIGS. 4A to 4E.

There may be provided additional cleaning means. In particular, there may be provided means for cleaning the wiper. As will be understood, in some circumstances the wiper may retain traces of waste after wiping the surface of the bowl. In this case the wiper may be cleaned for example by a cleaning fluid, such as water and/or air.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A toilet, comprising:
a bowl for receiving human waste, and a wiper; wherein
the bowl is moveable between a waste receiving position and a waste emptied position, said movement being provided based on a waste emptying actuation by a user of the toilet; and
the wiper is movable to remove residual waste from an inside surface of the bowl by wiping the inside surface of the bowl; and
the movement of the wiper is coupled to the movement of the bowl, the wiper being configured to move during the movement of the bowl, for at least a part of the movement of the bowl between the waste receiving position and the waste emptied position; and
wherein the wiper remains stationary during an initial stage of movement of the bowl from the waste receiving position.

2. The toilet of claim 1, the bowl has a waste emptying position, intermediate between the waste receiving position and the waste emptied position, and wherein the wiper begins to move when the bowl reaches the waste emptying position and after the received waste has been emptied from the bowl.

3. The toilet of claim 1, wherein the bowl is urged against a toilet pan when the bowl is in the waste receiving position, such that a rim of the bowl forms a seal against the toilet pan when in the waste receiving position.

4. The toilet of claim 1, wherein the bowl is urged into contact with the toilet pan when the bowl is in the waste emptied position, such that a surface of the bowl forms a seal against the toilet pan when in the waste emptied position.

5. The cleaning apparatus of claim 1, wherein the bowl does not seal against the toilet pan during movement of the bowl from the waste receiving position to the waste emptied position.

6. The toilet of claim 1, wherein the movement of the wiper includes a rotational movement.

7. The toilet of claim 1, wherein the movement of the bowl is driven manually.

8. The toilet of claim 1, wherein the movement of the bowl includes a rotational movement.

9. The toilet of claim 8, wherein an axis about which the bowl rotates is displaceable.

10. The toilet of claim 1, wherein the movement of the bowl is driven manually by the action of opening and/or closing a lid of the toilet.

11. The toilet of claim 10, wherein the action of opening and closing the lid of the toilet lid drives at least one further moving part of the toilet, the further moving part of the toilet being separate from the bowl and wiper.

12. The toilet of claim 11, wherein the further moving part of the toilet is a moving part for transporting waste out of a waste collection region beneath the bowl.

13. The toilet of claim 1, wherein a gear mechanism is provided by a bowl sprocket connected to the bowl and a wiper sprocket connected to the wiper, the bowl sprocket and the wiper sprocket being coupled to each other.

14. The toilet of claim 13, wherein the radius of the bowl sprocket is larger than the radius of the wiper sprocket.

15. The toilet of claim 13, wherein the bowl sprocket has teeth formed at only part of its circumference.

16. The toilet of claim 13, wherein the wiper sprocket has teeth formed at only part of its circumference.

17. The toilet of claim 13, wherein at least one of the wiper sprocket and the bowl sprocket has a radius which varies with position around the circumference of the sprocket.

18. The toilet of claim 13, wherein the wiper sprocket has an increased radius for an incomplete part of its circumference.

19. The toilet of claim 18, wherein the wiper sprocket has no teeth formed on the part of its circumference that has the increased radius.

20. A method for operating a toilet in which human waste is received in a bowl of the toilet, the method including the steps of:
a user of the toilet performing a waste emptying actuation, whereby moving the bowl from a waste receiving position to a waste emptied position, emptying waste from the bowl; and
moving a wiper to remove residual waste from an inside surface of the bowl by wiping the inside surface of the bowl;
wherein the movement of the wiper is coupled to the movement of the bowl, the wiper moving during movement of the bowl, for at least a part of the movement of the bowl between the waste receiving position and the waste emptied position; and wherein the wiper remains stationary during an initial stage of movement of the bowl from the waste receiving position.

\* \* \* \* \*